(12) United States Patent
Bae et al.

(10) Patent No.: US 9,069,137 B2
(45) Date of Patent: Jun. 30, 2015

(54) POLARIZER HAVING ENHANCED PHOTODURABILITY AND METHOD FOR PREPARING THE SAME

(71) Applicants: Chang Seok Bae, Uiwang-si (KR); Jin Sook Kim, Uiwang-si (KR); Eun Mi Kim, Uiwang-si (KR); Pil Joo Kim, Uiwang-si (KR); Eun Su Park, Uiwang-si (KR); Jae Bin Song, Uiwang-si (KR)

(72) Inventors: Chang Seok Bae, Uiwang-si (KR); Jin Sook Kim, Uiwang-si (KR); Eun Mi Kim, Uiwang-si (KR); Pil Joo Kim, Uiwang-si (KR); Eun Su Park, Uiwang-si (KR); Jae Bin Song, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 253 days.

(21) Appl. No.: 13/666,334

(22) Filed: Nov. 1, 2012

(65) Prior Publication Data

US 2013/0114137 A1 May 9, 2013

(30) Foreign Application Priority Data

Nov. 7, 2011 (KR) .................. 10-2011-0115303

(51) Int. Cl.
*G02B 5/30* (2006.01)

(52) U.S. Cl.
CPC .................... *G02B 5/3083* (2013.01)

(58) Field of Classification Search
CPC ........................................ G02B 5/3083
USPC ......... 359/483.01, 487.01, 487.02; 427/163.1
See application file for complete search history.

(56) References Cited

U.S. PATENT DOCUMENTS

| 7,781,070 B2 * | 8/2010 | Okano et al. ............... 428/522 |
| 2009/0109379 A1 * | 4/2009 | Fukagawa et al. ........... 349/96 |
| 2009/0323185 A1 * | 12/2009 | Goto et al. .................. 359/500 |
| 2010/0245727 A1 * | 9/2010 | Shigetomi et al. ........... 349/96 |
| 2011/0273646 A1 * | 11/2011 | Fukagawa et al. ........... 349/96 |
| 2011/0310481 A1 * | 12/2011 | Kwon et al. ............. 359/487.02 |
| 2012/0236408 A1 * | 9/2012 | Kwon et al. ............. 359/483.01 |

FOREIGN PATENT DOCUMENTS

| JP | 2000-035512 A | 2/2000 |
| KR | 10-2010-0089793 A | 8/2010 |

OTHER PUBLICATIONS

Korean Office Action Dated Jan. 27, 2014.
Korean Office Action Dated Jul. 29, 2014.

* cited by examiner

*Primary Examiner* — Frank Font
(74) *Attorney, Agent, or Firm* — Lee & Morse, P.C.

(57) ABSTRACT

A polarizer includes boric acid, potassium iodide, and a zinc salt. The zinc salt has a concentration gradient in which the concentration of the zinc salt gradually decreases from a surface of the polarizer to an interior thereof.

12 Claims, 2 Drawing Sheets

POLARIZER HAVING ENHANCED PHOTODURABILITY AND METHOD FOR PREPARING THE SAME

CROSS-REFERENCE TO RELATED APPLICATION

The present application claims priority under 35 U.S.C. §119 to Korean Patent Application No. 10-2011-0115303, filed on Nov. 7, 2011, in the Korean Intellectual Property Office, and entitled: "POLARIZER HAVING ENHANCED PHOTODURABILITY AND METHOD FOR PREPARING THE SAME," which is incorporated by reference herein in its entirety.

BACKGROUND

1. Field

Embodiments relate to a polarizer and a method for preparing the same. More particularly, the embodiments relate to a polarizer in which process variables are adjusted such that a concentration of zinc sulfates in the polarizer has a concentration gradient, and a method for preparing the same.

2. Description of the Related Art

Currently, liquid crystal displays (LCDs) are among the most widely used flat panel displays. The LCD includes an LCD panel, which includes two display panels each having electric field generating electrodes and a liquid crystal layer interposed between the panels. The LCD displays an image by applying voltage across the electric field generating electrodes to generate an electric field in the liquid crystal layer so as to determine orientations of liquid crystal molecules in the liquid crystal layer, while controlling polarization of incident light.

SUMMARY

Embodiments are directed to a polarizer that includes boric acid, potassium iodide, and a zinc salt. The zinc salt has a concentration gradient, in which the concentration of the zinc salt gradually decreases from a surface of the polarizer to an interior thereof.

On the surface of the polarizer, the concentration of the zinc salt may be at least about 80% of the total concentration of the zinc salt. At a point of about 40% of the total thickness of the polarizer from the surface thereof, the concentration of the zinc salt may be about 20% or less of the total concentration of the zinc salt.

The concentration gradient may have a concentration profile as defined by Equation 1:

$$C(d) = -4.0268 \times Ln(x) + 39.129, \quad \text{[Equation 1]}$$

In Equation 1, C(d) is the concentration of the zinc salt at a depth d of the polarizer from the surface thereof, and x is a depth from the surface of the polarizer.

The polarizer may include about 15 wt % to about 30 wt % of boric acid, about 1 wt % to about 5 wt % of potassium iodide, and about 0.01 wt % to about 0.5 wt % of the zinc salt.

The polarizer may have a $\Delta E_{ab}$ value less than or equal to about 3.5, as obtained by Equation 2:

$$\Delta E_{ab} = \sqrt{(Lc_{500} - Lc_0)^2 + (ac_{500} - ac_0)^2 + (bc_{500} - bc_0)^2}, \quad \text{[Equation 2]}$$

In Equation 2, $Lc_{500}$, $ac_{500}$ and $bc_{500}$ are chromaticity in an orthogonal state measured after heating at 85° C. for 500 hours, and $Lc_0$, $ac_0$ and $bc_0$ are chromaticity in an initial state.

Embodiments are also directed to a method for preparing a polarizer that includes immersing a polyvinyl alcohol film in an aqueous dyeing solution containing iodine and potassium iodide to obtain a dyed polyvinyl alcohol film, immersing the dyed polyvinyl alcohol film in an aqueous cross-linking solution containing boric acid and potassium iodide to obtain a cross-linked polyvinyl alcohol film, stretching the cross-linked polyvinyl alcohol film in an aqueous stretching solution containing boric acid and potassium iodide to obtain a stretched polyvinyl alcohol film, and immersing the stretched polyvinyl alcohol film in an aqueous color correction solution containing boric acid, potassium iodide, and a zinc salt.

The aqueous color correction solution may contain about 0.8 wt % to about 1.2 wt % of boric acid, about 3.6 wt % to about 4.0 wt % of potassium iodide, and about 1 wt % to about 2 wt % of a zinc salt, with a balance thereof being water.

The aqueous stretching solution may contain about 2.5 wt % to about 5.0 wt % of boric acid and about 1.0 wt % to about 5.0 wt % of potassium iodide, with a balance thereof being water, and the solution may be free of a zinc salt.

The method may further include immersing the polyvinyl film in a swelling bath before immersing the polyvinyl film in the aqueous dyeing solution.

Embodiments are also directed to a polarizer fabricated by the method. On the surface of the polarizer, the polarizer may have a concentration of a zinc salt of about 80% or more of the total concentration of the zinc salt. At a depth of about 40% of the total thickness of the polarizer from the surface thereof, the polarizer may have a concentration of the zinc salt of about 20% or less of the total concentration of the zinc salt.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 3:
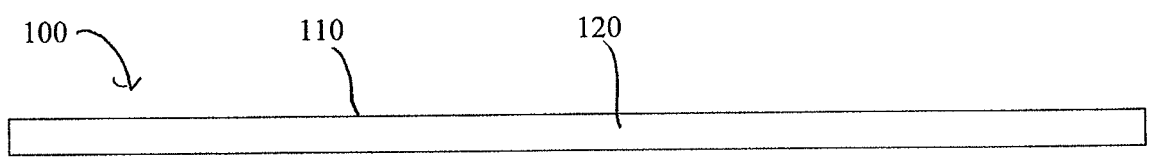
FIG. 3 schematically illustrates a polarizer according to an embodiment.

As schematically illustrated in FIG. 3, a polarizer 100 according to embodiments includes a surface 110 and an interior 120. The boric acid, potassium iodide and a zinc salt, and has a concentration gradient of the zinc salt decreasing from the surface 110 of the polarizer 100 to the interior 120 thereof.

In the embodiments, the zinc salt may be zinc sulfate, as an example.

On the surface 110 of the polarizer 100, the zinc salt may have a concentration of about 80% or more, preferably about 90% or more, of the total concentration of the zinc salt. At a depth of about 40% of the total thickness of the polarizer 100 from the surface 110 thereof, the zinc salt may have a concentration of about 20% or less, preferably about 10% or less, of the total concentration of the zinc salt. For example, when the total thickness of the polarizer film is 250 nm, the zinc salt may have a concentration of about 20% or less of the total concentration of the zinc salt at a depth of 100 nm from the surface of the polarizer film. In an implementation, the surface 110 of the polarizer 100 may include the zinc salt in a concentration of 80% or more, preferably about 90% or more, of the total weight of the zinc salt in the polarizer 100, and at a depth of about 40% of the total thickness of the polarizer 100 from the surface 110 thereof, the polarizer 100 may include the zinc salt at a concentration of about 20% or less, preferably about 10% or less, of the total weight of the zinc salt. When the concentration of the zinc salt has such a concentration gradient in the polarizer 100, it may be possible to reduce the amount of the zinc salt in the fabrication of the polarizer 100. In the case where the concentration of the zinc salt is high in a bath, the concentration of the zinc salt may increase and the increased concentration of the zinc salt may result in an undesired appearance. The present embodiment may adjust the concentration of the zinc salt to have an inclined gradient.

The concentration gradient of the zinc salt may have a concentration profile as defined by Equation 1.

$$C(d) = -4.0268 \times Ln(x) + 39.129 \quad \text{[Equation 1]}$$

In Equation 1, C(d) is the concentration of the zinc salt at a depth d of the polarizer 100 from the surface 110 thereof, and x is a depth of the polarizer 100 from the surface 110 thereof.

The polarizer 100 may contain about 15 wt % to about 30 wt % of boric acid, preferably about 20 wt % to about 25 wt % of boric acid. In this range of the boric acid, the polarizer 100 may be prevented from rupturing and may exhibit excellent properties in terms of, for example, a degree of polarization.

The polarizer 100 may contain about 1 wt % to about 5 wt % of potassium iodide, preferably about 2 wt% to about 4 wt % of potassium iodide. In this range of the potassium iodide, the polarizer 100 may be prevented from emitting a blue color and lowering the degree of polarization, and durability may be ensured.

The polarizer 100 may contain about 0.01 wt % to about 0.5 wt % of a zinc salt, preferably about 0.05 wt% to about 0.3 wt % of a zinc salt. In this range of the zinc salt, the polarizer 100 may undergo less color change upon durability testing and may be prevented from emitting a blue color.

The polarizer 100 may have a $\Delta E_{ab}$ value that is less than or equal to about 3.5, as obtained by Equation 2.

$$\Delta E_{ab} = \sqrt{(Lc_{500} - Lc_0)^2 + (ac_{500} - ac_0)^2 + (bc_{500} - bc_0)^2}, \quad \text{[Equation 2]}$$

In Equation 2, $Lc_{500}$, $ac_{500}$ and $bc_{500}$ are chromaticity in an orthogonal state measured after heating at 85° C. for 500 hours, and $Lc_0$, $ac_0$ and $bc_0$ are chromaticity in an initial state (in a Lab color space).

Figure 1:
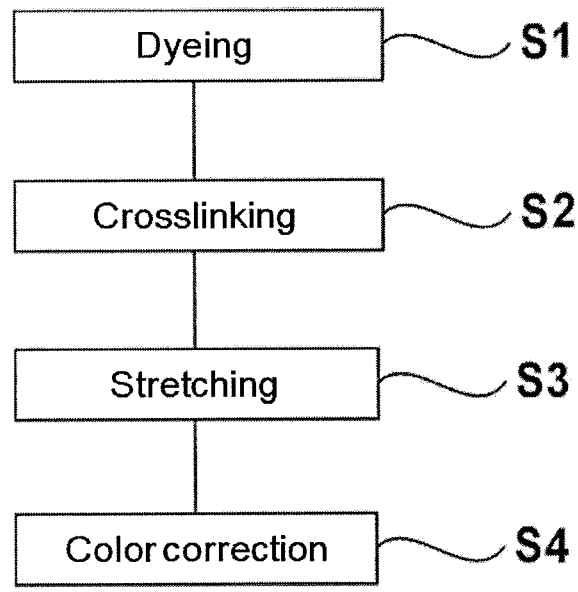
FIG. 1 illustrates a flowchart of a method for preparing a polarizer in accordance with one exemplary embodiment.

FIG. 1 is a flowchart of a method for preparing the polarizer 100 in accordance with one exemplary embodiment. As shown in FIG. 1, the fabrication method according to this embodiment may include: dyeing (S1); cross-linking (S2); stretching (S3); and color correction (S4). For example, the method may include immersing a polyvinyl alcohol film in an aqueous dyeing solution containing iodine and potassium iodide; immersing the dyed polyvinyl alcohol film in an aqueous cross-linking solution containing boric acid and potassium iodide; stretching the cross-linked polyvinyl alcohol film in an aqueous stretching solution containing boric acid and potassium iodide; and immersing the stretched polyvinyl alcohol film in an aqueous color correction solution containing boric acid, potassium iodide, and a zinc salt.

Before dyeing with the aqueous dyeing solution, the polyvinyl alcohol film may be subjected to swelling. Swelling of the film may be performed to remove foreign matter from the surface of the film or to enhance dyeing performance. Swelling may be performed at about 22° C. to about 32° C. in a swelling bath.

After swelling, the polyvinyl alcohol film is dyed in the aqueous dyeing solution containing iodine and potassium iodide. The aqueous dyeing solution may contain about 0.05 to about 0.2 parts by weight of iodine and about 0.5 to about 2.5 parts by weight of potassium iodide, based on about 100 parts by weight of water. Dyeing with iodine may be performed at about 20° C. to about 40° C. for about 2 to about 4 minutes.

The dyed polyvinyl alcohol film is then subjected to crosslinking and stretching in a cross-linking bath. In the crosslinking bath, the concentration of boric acid may be in the range of about 2.5 wt % to about 4.0 wt % and the temperature may be in the range of about 30° C. to about 55° C. Crosslinking may be performed for about 1 to about 2 minutes.

The crosslinked film is then subjected to stretching at a stretching ratio of about 2.5 to about 4.0. The aqueous stretching solution may contain about 2.5 wt % to about 5.0 wt % of boric acid, about 1.0 wt % to about 5.0 wt % of potassium iodide, and the balance of water, and may have a temperature ranging from about 54° C. to about 58° C. The total stretching ratio may be in the range of about 5.8 to about 6.5. Preferably, the aqueous stretching solution may contain about 2.5 wt % to about 3.5 wt % of boric acid, about 2.5 wt % to about 3.5 wt % of potassium iodide, with the balance being water. In these ranges, the polarizer 100 may undergo less color change, may be prevented from forming stains, and may obtain a desired color. Preferably, the aqueous stretching solution is free of any zinc salt in the stretching process. An optical film having a concentration gradient that decreases from the surface of the film to the interior thereof may be effectively fabricated by immersing the stretched film in an aqueous solution containing a zinc salt after stretching the film, i.e. through color correction.

In one embodiment, the aqueous color correction solution may contain about 0.8 wt % to about 1.2 wt % of boric acid, about 3.6 wt % to about 4.0 wt % of potassium iodide, about 1 wt % to about 2 wt % of a zinc salt, with the balance being water. Within these ranges, the polarizer may undergo less color change, may be prevented from forming stains, and may obtain a desired color. Further, with the color correction solution containing the zinc salt, the zinc salt may be contained in an amount of about 0.01 wt % to about 0.5 wt % in the polarizer.

The following Examples and Comparative Examples are provided in order to highlight characteristics of one or more embodiments. It is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Examples 1~2 and Comparative Examples 1~2

A 60 μm thick polyvinyl alcohol film (VF-PS #6000, Kuraray Co., Ltd.) was swelled at 30° C. in a swelling bath, and then dyed in an aqueous dyeing solution containing iodine and potassium iodide. The iodine dyeing bath contained 0.1 parts by weight of iodine and 2 parts by weight of potassium iodide based on by 100 parts by weight of water. Iodine dyeing was performed at 30° C. for 3 minutes. The dyed polyvinyl alcohol film was subjected to crosslinking in a crosslinking bath containing 3 wt % of boric acid at 40° C. for 1 minute. The crosslinked film was stretched again at a stretching ratio of 3. The stretching bath contained 3 wt % of boric acid, 3 wt % of potassium iodide, with the balance being water. The stretching bath had a temperature of 55° C. Then, the stretched film was immersed in an aqueous color correction solution having a composition as listed in Table 1, thereby preparing a polarizer. The overall stretching ratio was set to 6. A polarizer film was fabricated by stacking 80 μm thick and 40 μm thick TAC (triacetylcellulose) films on upper and lower sides of the obtained polarizer, respectively.

TABLE 1

|  | Composition of aqueous color correction solution (wt %) | | | |
| --- | --- | --- | --- | --- |
|  | Boric acid | Potassium iodide | Zinc sulfate | Water |
| Example 1 | 1.0 | 3.8 | 1 | 94.2 |
| Example 2 | 1.0 | 3.8 | 2 | 93.2 |
| Comparative Example 1 | 1.0 | 3.8 | — | 95.2 |
| Comparative Example 2 | 1.0 | 3.8 | 5 | 90.2 |

Each composition of the polarizer films of Examples 1 and 2 and Comparative

Example 1 and 2 was measured using a potentiometer and ion chromatography, and the results are shown in Table 2. After laminating each polarizer film onto a non-alkali glass substrate, polarization properties of the polarizer film were measured using a V-7100 spectrophotometer commercially available from JASCO Corp. (Japan). Further, in order to measure the durability of the polarizer film, the polarization properties of the polarizer film were measured again using the spectrophotometer after heating the polarizer film in an oven at 85° C. for 500 hours. Also, a pair of optical films was placed orthogonal to each other on a backlight unit to observe color change.

TABLE 2

|  | Boric acid | Potassium iodide | Zinc sulfate |
| --- | --- | --- | --- |
| Example 1 | 21.4 wt % | 3.0 wt % | 0.08 wt % |
| Example 2 | 21.5 wt % | 2.9 wt % | 0.15 wt % |
| Comparative Example 1 | 21.2 wt % | 3.0 wt % | — |
| Comparative Example 2 | 21.2 wt % | 3.0 wt % | 0.45 wt % |

Before and after the durability testing (before and after placing the optical films in the oven at 85° C. for 500 hours), the change in optical properties of the optical films of Examples 1 and 2 and Comparative Examples 1 and 2 was evaluated by the color change ($\Delta E_{ab}$) in an orthogonal state. The appearance and redness of the optical films in the orthogonal state were evaluated with the naked eye. The results are shown in Table 3.

Figure 2:
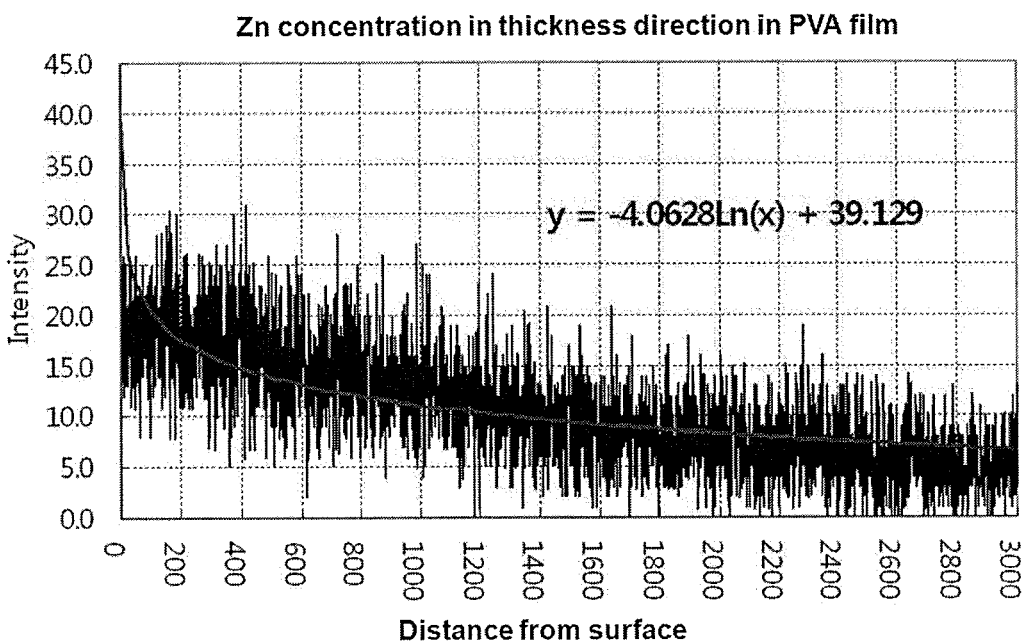
FIG. 2 illustrates a graph of a concentration profile of zinc across the depth of the polarizer fabricated in Example 1.

Transmittance and colors of the optical films of Examples 1 and 2 and Comparative Examples 1 and 2 were measured using a spectrophotometer, and the color change ($\Delta E_{ab}$) in the orthogonal state was obtained by the following Equation 2. In Examples 1 and 2 and Comparatives 1 and 2, the concentration of zinc was measured on the surface and at a point at 40% of the total thickness using TEM-EDS. FIG. 2 shows a concentration profile of zinc according to the thickness of the polarizer prepared in Example 1.

$$\Delta E_{ab} = \sqrt{(Lc_{500}-Lc_0)^2 + (ac_{500}-ac_0)^2 + (bc_{500}-bc_0)^2} \quad \text{[Equation 2]}$$

In Equation 2, $Lc_{500}$, $ac_{500}$ and $bc_{500}$ are the chromaticity in an orthogonal state measured after heating at 85° C. for 500 hours, and $Lc_0$, $ac_0$ and $bc_0$ are the chromaticity in an initial state.

TABLE 3

|  | Concentration of zinc on surface (%) | Concentration of zinc at 40% of thickness (%) | $\Delta E_{ab}$ | Appearance | Appearance |
| --- | --- | --- | --- | --- | --- |
| Example 1 | 90 | 2 | 2.66 | Good | Good |
| Example 2 | 92 | 1.2 | 1.41 | Good | Very good |
| Comparative Example 1 | — | — | 4.84 | Good | Red |
| Comparative Example 2 | 44 | 44 | 0.45 | Bad | Bluish |

From the results listed in Table 3, it can be seen that that optical films of

Examples 1 and 2 had $\Delta E_{ab}$ values lower than the optical film of Comparative Example 1 using the aqueous color correction solution free from a zinc salt. In particular, the optical films of Examples 1 and 2 were found to have $\Delta E_{ab}$ values that are about ⅓ of the $\Delta E_{ab}$ value of the optical film of Comparative Example 1. Further, it could be seen that the optical films of Examples 1 and 2 had an appearance that was similar to or better than the optical films where the aqueous color correction solution did not contain the zinc salt (Comparative Example 1) and where the aqueous color correction solution contained an excessive amount of the zinc salt (Comparative Example 2). Moreover, the optical films of Examples 1 and 2 exhibited better optical properties than the optical films of the comparative examples in evaluation by the naked eye. Accordingly, it can be seen that the optical films according to the example embodiments had better optical properties than the optical films of the comparative examples.

By way of summation and review, a polarizing plate may be disposed outside an LCD panel. The polarizing plate may control polarization by selectively transmitting a light component in a specific direction therethrough among light emitted from a backlight unit and light that has passed through the liquid crystal layer.

The polarizing plate includes a polarizer capable of polarizing light in a specific direction and a protective layer for supporting and protecting the polarizer. Generally, the polarizer is fabricated by dyeing a polyvinyl alcohol film with dichroic iodine, followed by crosslinking the polyvinyl alcohol film with boric acid or the like. Such a polarizer may undergo a color change over time.

In contrast, embodiments may provide a polarizer that has a concentration gradient in which the concentration of a zinc salt gradually decreases from a surface of the polarizer to an interior thereof Such a polarizer may undergo less color change over time and may have an enhanced photodurability.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A polarizer comprising:
   boric acid;
   potassium iodide; and
   a zinc salt, wherein the zinc salt has a concentration gradient in which the concentration of the zinc salt gradually decreases from a surface of the polarizer to an interior thereof.

2. The polarizer as claimed in claim 1, wherein:
   on the surface of the polarizer, the concentration of the zinc salt is at least about 80% of the total concentration of the zinc salt, and
   at a point of about 40% of a total thickness of the polarizer from the surface thereof, the concentration of the zinc salt is about 20% or less of the total concentration of the zinc salt.

3. The polarizer as claimed in claim 1, wherein the concentration gradient has a concentration profile as defined by Equation 1:

$$C(d) = -4.0268 \times Ln(x) + 39.129; \quad \text{[Equation 1]}$$

wherein $C(d)$ is the concentration of the zinc salt at a depth d of the polarizer from the surface thereof, and x is a depth from the surface of the polarizer.

4. The polarizer as claimed in claim 1, wherein the polarizer includes:
   about 15 wt % to about 30 wt % of boric acid,
   about 1 wt % to about 5 wt % of potassium iodide, and
   about 0.01 wt % to about 0.5 wt % of the zinc salt.

5. The polarizer as claimed in claim 1, wherein the polarizer has a $\Delta E_{ab}$ value less than or equal to about 3.5, as obtained by Equation 2:

$$\Delta E_{ab} = \sqrt{(Lc_{500} - Lc_0)^2 + (ac_{500} - ac_0)^2 + (bc_{500} - bc_0)^2}, \quad \text{[Equation 2]}$$

wherein $Lc_{500}$, $ac_{500}$ and $bc_{500}$ are chromaticity values of the polarizer in an orthogonal state measured after heating the polarizer at 85° C. for 500 hours, and $Lc_0$, $ac_0$ and $bc_0$ are chromaticity values of the polarizer in an initial state.

6. A method for preparing a polarizer, the method comprising:
   immersing a polyvinyl alcohol film in an aqueous dyeing solution containing iodine and potassium iodide to obtain a dyed polyvinyl alcohol film; immersing the polyvinyl film in a swelling bath before immersing the polyvinyl alcohol film in the aqueous dyeing solution;
   immersing the dyed polyvinyl alcohol film in an aqueous cross-linking solution containing boric acid and potassium iodide to obtain a cross-linked polyvinyl alcohol film;
   stretching the cross-linked polyvinyl alcohol film in an aqueous stretching solution containing boric acid and potassium iodide to obtain a stretched polyvinyl alcohol film; and
   immersing the stretched polyvinyl alcohol film in an aqueous color correction solution containing boric acid, potassium iodide, and a zinc salt.

7. The method as claimed in claim 6, wherein the aqueous color correction solution contains about 0.8 wt % to about 1.2 wt % of boric acid, about 3.6 wt % to about 4.0 wt % of potassium iodide, and about 1 wt % to about 2 wt % of zinc salt, with a balance thereof being water.

8. The method as claimed in claim 6, wherein the aqueous stretching solution contains about 2.5 wt % to about 5.0 wt % of boric acid, about 1.0 wt % to about 5.0 wt % of potassium iodide, a balance thereof being water, the aqueous stretching solution being free of a zinc salt.

9. The method as claimed in claim 6, further comprising immersing the polyvinyl film in a swelling bath before immersing the polyvinyl alcohol film in the aqueous dyeing solution.

10. A polarizer fabricated by the method as claimed in claim 6, wherein, on a surface of the polarizer, the polarizer has a concentration of a zinc salt of about 80% or more of a total concentration of the zinc salt and, at a depth of about 40% of a total thickness of the polarizer from the surface thereof, the polarizer has a concentration of the zinc salt of about 20% or less of the total concentration of the zinc salt.

11. A polarizer fabricated by the method as claimed in claim 7, wherein, on a surface of the polarizer, the polarizer has a concentration of a zinc salt of about 80% or more of a total concentration of the zinc salt and, at a depth of about 40% of a total thickness of the polarizer from the surface thereof, the polarizer has a concentration of the zinc salt of about 20% or less of the total concentration of the zinc salt.

12. A polarizer fabricated by the method as claimed in claim 8, wherein, on a surface of the polarizer, the polarizer has a concentration of a zinc salt of about 80% or more of a total concentration of the zinc salt and, at a depth of about 40% of a total thickness of the polarizer from the surface thereof, the polarizer has a concentration of the zinc salt of about 20% or less of the total concentration of the zinc salt.

* * * * *